United States Patent
Soraku et al.

(10) Patent No.: US 10,454,722 B2
(45) Date of Patent: Oct. 22, 2019

(54) IN-VEHICLE PROCESSING DEVICE AND IN-VEHICLE SYSTEM

(71) Applicant: HITACHI AUTOMOTIVE SYSTEMS, LTD., Hitachinaka-shi, Ibaraki (JP)

(72) Inventors: Koichi Soraku, Hitachinaka (JP); Kenichi Osada, Hitachinaka (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 0 days.

(21) Appl. No.: 16/066,689

(22) PCT Filed: Mar. 13, 2017

(86) PCT No.: PCT/JP2017/009856
§ 371 (c)(1),
(2) Date: Jun. 28, 2018

(87) PCT Pub. No.: WO2017/163948
PCT Pub. Date: Sep. 28, 2017

(65) Prior Publication Data
US 2019/0028303 A1    Jan. 24, 2019

(30) Foreign Application Priority Data
Mar. 25, 2016    (JP) .................. 2016-061428

(51) Int. Cl.
*H04L 25/02*    (2006.01)
*B60R 16/023*    (2006.01)
(Continued)

(52) U.S. Cl.
CPC .......... *H04L 25/029* (2013.01); *B60R 16/023* (2013.01); *H04B 1/10* (2013.01);
(Continued)

(58) Field of Classification Search
CPC ... H04L 25/029; H04L 25/02; H04L 25/0292; H04B 1/10; H04B 1/40; H04B 3/02; H04B 3/56; B60R 16/023
(Continued)

(56) References Cited

U.S. PATENT DOCUMENTS 7,124,027 B1 * 10/2006 Ernst, Jr. .............. B60W 30/09
                                                        701/301
2006/0214507 A1    9/2006 Suzuki
(Continued)

FOREIGN PATENT DOCUMENTS

JP    2004-304365 A    10/2004
JP    2012-235336 A    11/2012
(Continued)

OTHER PUBLICATIONS

Japanese Office Action dated Feb. 26, 2019 for the Japanese Patent Application No. 2018-507228.
International Search Report, PCT/JP2017/009856, dated Jun. 27, 2017, 2 pgs.

*Primary Examiner* — Michael R Neff
(74) *Attorney, Agent, or Firm* — Volpe and Koenig, P.C.

(57) ABSTRACT

The present invention provides an in-vehicle processing device and an in-vehicle system capable of reducing power consumption while suppressing quality degradation of data to be transmitted and received. An ECU includes a data transmission and reception device for transmitting and receiving data and an MPU for controlling the data transmission and reception device. The data transmission and reception device includes a filter device and a steady current suppression circuit. The filter device attenuates noise that is superimposed on data by reflection of the data. The steady current suppression circuit suppresses a steady current flowing through the filter device and facilitates a transient current flowing through the filter device.

9 Claims, 2 Drawing Sheets

(51) Int. Cl.
*H04B 3/02* (2006.01)
*H04B 1/10* (2006.01)
*H04B 3/56* (2006.01)
*H04B 1/40* (2015.01)

(52) U.S. Cl.
CPC .............. *H04B 3/02* (2013.01); *H04B 3/56* (2013.01); *H04L 25/02* (2013.01); *H04L 25/0292* (2013.01); *H04B 1/40* (2013.01); *H04B 2203/5491* (2013.01)

(58) Field of Classification Search
USPC ......................................................... 375/350
See application file for complete search history.

(56) References Cited

U.S. PATENT DOCUMENTS

| | | | |
|---|---|---|---|
| 2010/0097178 A1* | 4/2010 | Pisz | B60R 16/037 340/5.72 |
| 2010/0219904 A1* | 9/2010 | Kishigami | H04L 12/40045 333/124 |
| 2010/0245304 A1* | 9/2010 | Umezaki | G09G 3/20 345/205 |
| 2016/0036604 A1 | 2/2016 | Mori et al. | |

FOREIGN PATENT DOCUMENTS

| | | |
|---|---|---|
| JP | 2015-053633 A | 3/2015 |
| JP | 2016-034080 A | 3/2016 |

* cited by examiner

IN-VEHICLE PROCESSING DEVICE AND IN-VEHICLE SYSTEM

TECHNICAL FIELD

The present invention relates to an in-vehicle processing device and an in-vehicle system.

BACKGROUND ART

With the progress in safe driving support and automatic driving technology, the traffic of in-vehicle networks is increasing. In order to handle this, there is a known CAN with Flexible Data-rate (CAN FD) communication system capable of accelerating data transmission and data length extension. In the CAN FD, nodes that perform transmission and reception are typically electronic control units (ECU) as in-vehicle processing devices, and each of the nodes is electrically connected with each other by a bus. A transmission ECU adds an identifier (ID) to communication data to form a message, converts the message into an electric signal to be transmitted onto the bus. Each of the ECUs monitors electric signals on the bus, obtains the ID being used for communication, and identifies the message to be received.

In a case where a plurality of messages is simultaneously transmitted, priority of communication is determined in accordance with the ID. The phase that determines the ECU capable of transmitting the IDs and transmitting the message with the priority is referred to as an arbitration phase. In the arbitration phase, since output is performed simultaneously by a plurality of ECUs, communication is performed at a same speed as the conventional CAN, for example, at 500 kbps. After the ECU that transmits the message is determined by arbitration, the phase proceeds to a data phase for data transmission. The transmission speed in the data phase in which one specified ECU performs output is 2 Mbps, for example.

This, however, would cause a problem of failure in correct data transmission due to effects of reflection generated when the communication speed is increased to 2 Mbps in a conventional network configuration enabling communication at 500 kbps. As a method for removing noise due to the reflection, there is a known configuration including a filter circuit that removes noise and a resistor that allows a current to flow through the filter circuit (for example, refer to PTL 1).

CITATION LIST

Patent Literature

PTL 1: JP 2015-53633 A

SUMMARY OF INVENTION

Technical Problem

Unfortunately, however, the technique disclosed in PTL 1 has a problem that since a resistor is connected between the lines, the DC current flow during dominant would decrease the amplitude of the signal (data), leading to degradation of signal quality and an increase in power consumption.

The present invention aims to provide an in-vehicle processing device and an in-vehicle system capable of reducing power consumption while suppressing quality degradation of data to be transmitted and received.

Solution to Problem

To achieve the above aim, the present invention includes a data transmission and reception device that transmits and receives data, and a processor that controls the data transmission and reception device. The data transmission and reception device includes a filter device that attenuates noise superimposed on the data by reflection of the data, and a steady current suppression circuit that suppresses a steady current flowing through the filter device and facilitates a transient current flowing through the filter device.

Advantageous Effects of Invention

According to the present invention, it is possible to reduce power consumption while suppressing quality degradation of data to be transmitted and received. Problems, configurations, and effects other than in the above will become apparent by the following description in the embodiments as follows.

DESCRIPTION OF EMBODIMENTS

Figure 1:
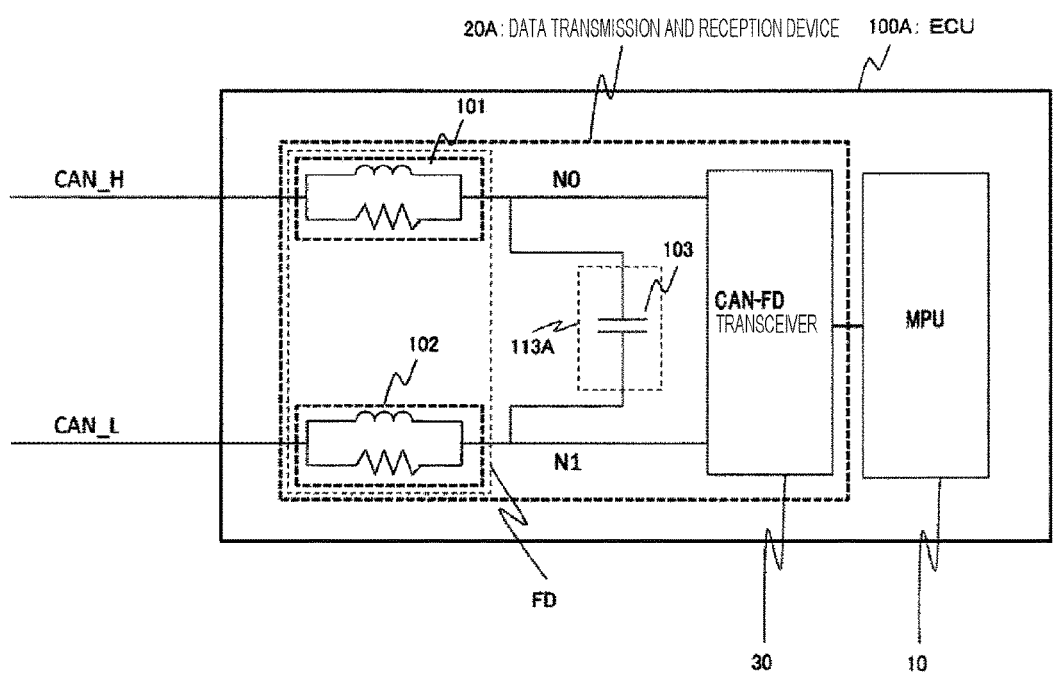
FIG. 1 is a block diagram illustrating a configuration of an ECU according to a first embodiment of the present invention.

Hereinafter, a configuration and operation of an ECU as the in-vehicle processing device according to the first to third embodiments of the present invention will be described with reference to the drawings. In each of the figures, the same reference numerals denote the same portions.

(First Embodiment)

FIG. 1 illustrates a configuration of an ECU (100A) according to a first embodiment. A pair of CAN buses (CAN_H and CAN_L) is connected to the ECU (100A). The ECU (100A) is formed with a micro processing unit (MPU) 10 and a data transmission and reception device 20A.

In other words, the ECU 100A (in-vehicle processing device) includes the data transmission and reception device 20A that transmits and receives data and the MPU 10 (processor) that controls the data transmission and reception device 20A.

In the data transmission and reception device 20A, filter circuits (101 and 102) are respectively connected between the CAN bus (CAN_H and CAN_L) and internal nodes (N0 and N1). The internal nodes (N0 and N1) are connected to a CANFD transceiver 30 (CANFD driver).

In other words, the data transmission and reception device 20A includes the internal node N0 (first communication line) and the internal node N1 (second communication line) constituting a differential transmission path.

An example of the filter circuits (101 and 102) used is a ferrite bead equivalent to a circuit including resistors and coils. The filter circuits (101 and 102) constitute a filter device FD that attenuates noise superimposed on data by reflection of data.

In other words, the filter device FD includes a filter circuit 101 (first low-pass filter) provided in the internal node N0 (first communication line), and a filter circuit 102 (second low-pass filter) provided in the internal node N1 (second communication line).

In addition, a portion between the internal nodes (N0 and N1) is connected to a capacitor 103 serving as a steady current suppression circuit 113A that facilitates the transient current flow and suppresses a steady current.

In other words, the steady current suppression circuit 113A suppresses a steady current flowing through the filter device FD and facilitates a transient current (noise current) flowing through the filter device FD. The steady current suppression circuit 113A has one end connected to the internal node N0 (first communication line) and the other end connected to the internal node N1 (second communication line).

The CAN FD performs data transmission using modes referred to as recessive and dominant. In the recessive mode, a pair of buses is set to the same potential by a termination circuit (not illustrated) existing on the CAN bus. In the dominant mode, a potential difference is produced between the pair of buses CAN_H and CAN_L by the CANFD transceiver 30. This allows transmission of data of 0 or 1.

At data mode shift from the dominant mode to the recessive mode, noise is generated due to reflection of signals in the CAN bus. The generated noise is attenuated by a current flowing into filter circuits (101 and 102) caused by a transient current flowing between the CAN_H and CAN_L through the capacitor 103.

In the dominant or recessive steady state, a steady current is suppressed by the capacitor 103 and the potential is held. Since DC current is suppressed, power consumption can also be reduced.

In other words, the data transmission and reception device 20A transmits and receives data in accordance with the CAN FD protocol. The steady current suppression circuit 113A suppresses a steady current flowing through the filter device FD in a steady state of dominant or recessive, and facilitates a transient current flowing through the filter device FD at transition from dominant to recessive.

As described above, according to the present embodiment, the steady current (DC current) is suppressed by the capacitor 103 and thus the potential of the CAN bus (CAN_H and CAN_L) is held, resulting in no decrease in the amplitude of a signal waveform corresponding to the data transmitted and received. In addition, the transient current (noise current) flowing through the filter device FD is facilitated by the capacitor 103, leading to attenuation of the noise superimposed on data transmitted and received. Since the noise is attenuated with no reduction in the amplitude of the signal waveform, it is possible to suppress quality degradation of data transmitted and received.

In addition, the steady current is suppressed by the capacitor 103, making it possible to reduce power consumption as compared with the conventional example in which steady current flows from CAN_H to CAN_L via a resistor.

While the present embodiment uses the capacitor 103 as the steady current suppression circuit 113A, similar effects can be obtained by using a current source of active control or a switch element (switching element) such as a transistor instead of the capacitor 103.

(Second Embodiment)

Figure 2:
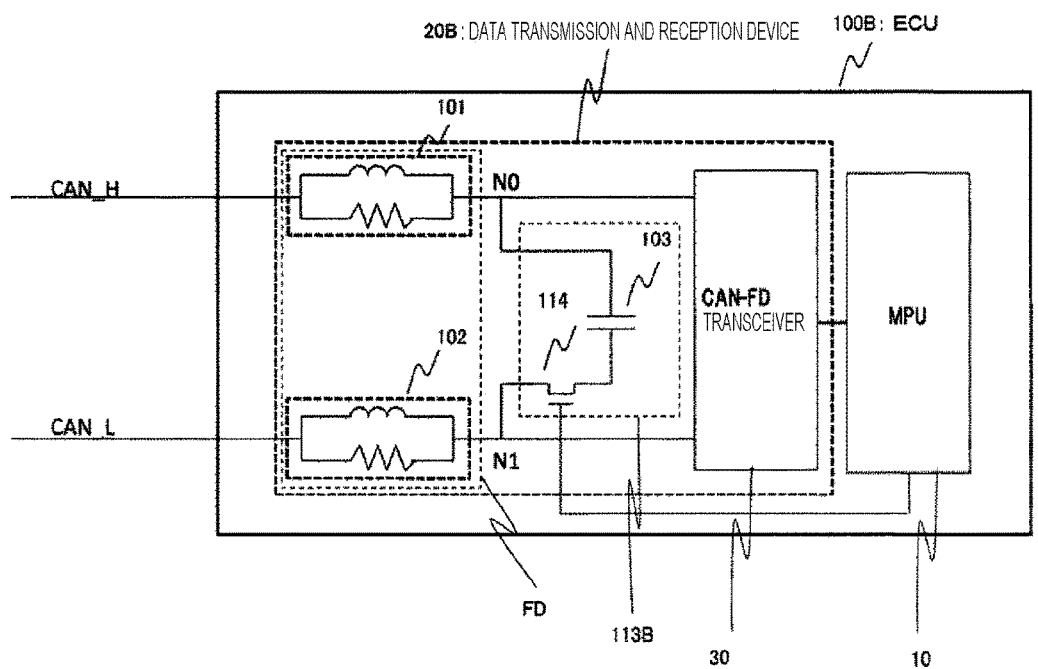
FIG. 2 is a block diagram illustrating a configuration of an ECU according to a second embodiment of the present invention.

FIG. 2 illustrates a configuration of an ECU (100B) according to a second embodiment. As compared with the first embodiment, a steady current suppression circuit 113B in the present embodiment further includes a switch 114.

That is, the steady current suppression circuit 113B in the second embodiment includes the switch 114 that is on/off controlled by the MPU between the capacitor 103 and either of the internal nodes N0 and N1. This switch 114 is in normally OFF state, with the steady current suppression circuit 113B not connecting the internal nodes N0 and N1, that is, the nodes are disconnected from each other. Under the control of the MPU 10, the switch 114 is turned on when the ECU 10 is in a transmission state with respect to the CAN bus, connecting the nodes (N0 and N1) with each other by the steady current suppression circuit 113B, so as to form a circuit equivalent to the circuit in the first embodiment.

In other words, the steady current suppression circuit 113B suppresses the steady current flowing through the filter device FD and facilitates the transient current flowing through the filter device FD during a period in which the data transmission and reception device 20B transmits the data.

Specifically, the steady current suppression circuit 113B includes the switch 114 (switch element) connected in series to the capacitor 103. The MPU 10 (processor) turns off the switch 114 (switch element) during a period in which the data transmission and reception device 20B receives data, while turns on the switch 114 during a period in which the data transmission and reception device 20B transmits data.

Since noise is generated when the ECU is in the transmission state, the steady current suppression circuit 113B is connected only at the time of transmission and is disconnected at other times. This makes it possible to reduce the load capacitance of the CAN bus (CAN_H and CAN_L), reduce the power consumption, and enhance signal quality.

Moreover, since the switch 114 is influenced by noise only in the data phase with high speed rate, controlling of connecting the steady current suppression circuit 113B only when the ECU (100B) is in the transmission state and in the data phase would also be effective.

In other words, the data transmission and reception device 20B transmits and receives data in accordance with the CAN FD protocol. The data transmission and reception device 20B suppresses the steady current flowing through the filter device FD in the data phase and facilitates the transient current flowing through the filter device FD.

According to the present embodiment as described above, it is possible to reduce power consumption while suppressing quality degradation of data to be transmitted and received.

In the present embodiment, the switch 114 is turned off and the capacitor 103 is disconnected during a period of data reception, making it possible to reduce the load capacitance of the CAN bus (CAN_H and CAN_L).

(Third Embodiment)

Figure 3:
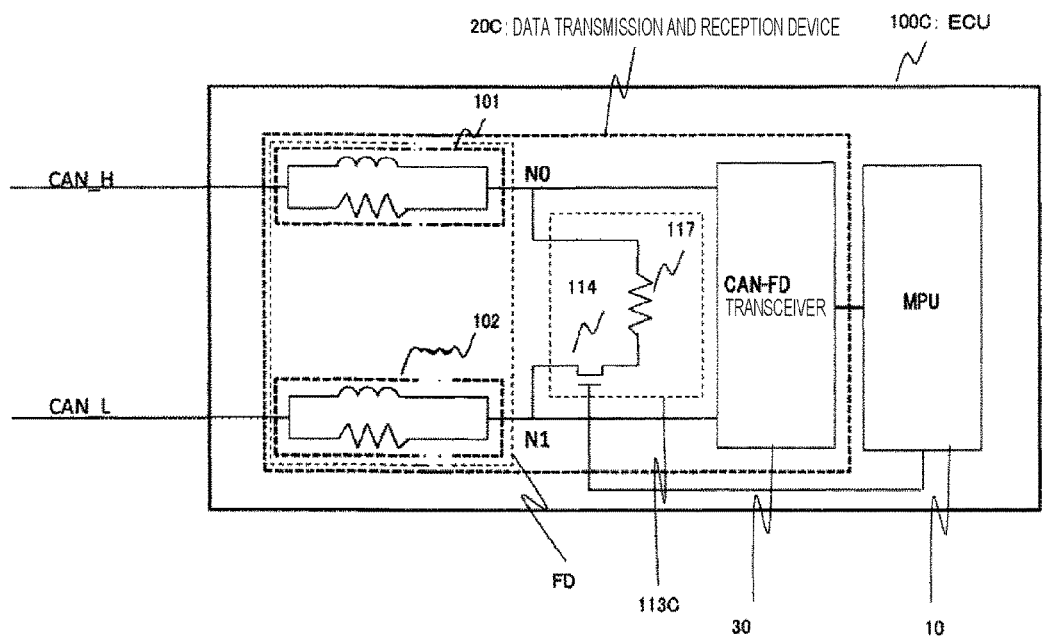
FIG. 3 is a block diagram illustrating a configuration of an ECU according to a third embodiment of the present invention.

FIG. 3 illustrates a configuration of an ECU (100C) according to a third embodiment. The steady current suppression circuit 113C includes a resistor 117 and the switch 114. In other words, the steady current suppression circuit 113C corresponds to the steady current suppression circuit 113B illustrated in FIG. 2 in which the capacitor 103 is replaced with the resistor 117. Specifically, the steady current suppression circuit 113C includes the resistor 117 and the switch 114 (switch element) connected in series to the resistor 117.

The MPU 10 performs on/off control of the switch 114 similarly to the second embodiment. That is, the MPU 10 (processor) turns off the switch 114 (switch element) during a period in which the data transmission and reception device 20C receives data, while turns on the switch 114 during a period in which the data transmission and reception device 20C transmits data.

Since noise is generated when the ECU (100C) is in the transmission state, the resistor 117 is connected only at the time of transmission and is disconnected at other times. This makes it possible to reduce the steady current of the CAN bus, reduce the power consumption, and enhance signal quality. The present embodiment is characterized in that the resistor 117 absorbs noise and converts the noise into heat, making it possible to facilitate attenuation of the noise.

Moreover, the switch 114 is influenced by noise only in the data phase being a phase with a high speed rate, and thus, controlling of connecting the steady current suppression circuit 113C only when the ECU (100C) is in the transmission state and in the data phase would also be effective.

According to the present embodiment as described above, it is possible to reduce power consumption while suppressing quality degradation of data to be transmitted and received.

In the present embodiment, in particular, the switch 114 is turned off and the resistor 117 is disconnected during the period of data reception, making it possible to reduce the power consumption as compared with the conventional example. Moreover, since the switch 114 is turned on and the resistor 117 is connected during a period of data transmission, attenuation of noise can be facilitated.

(Application Example to In-Vehicle System)

Figure 4:
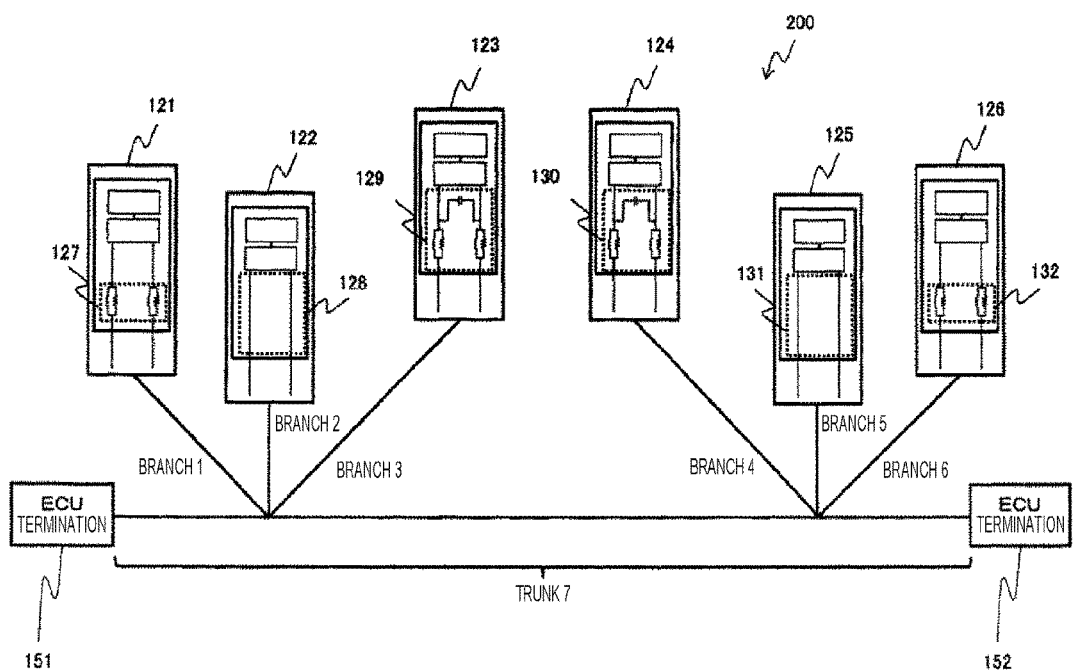
FIG. 4 is a configuration diagram of an in-vehicle system to which an ECU according to a first embodiment of the present invention is applied.

FIG. 4 illustrates a configuration of an in-vehicle system 200 to which the ECU (100A) according to the first embodiment is applied. The in-vehicle system 200 mainly includes: ECUs (123 and 124) having the same configuration as the ECU (100A) described in the first embodiment; ECUs (121 and 126) obtained by removing the steady current suppression circuit 113A from the ECU (100A); and ECUs (122 and 125) obtained by removing the filter circuits (101 and 102) and the steady current suppression circuit 113A from the ECU (100A).

A branch 1 is connected to the ECU 121, a branch 2 to the ECU 122, a branch 3 to the ECU 123, a branch 4 to the ECU 124, a branch 5 to the ECU 125, and a branch 6 to the ECU 126.

In other words, the in-vehicle network includes a trunk 7 and the plurality of branches 1 to 6. The in-vehicle system 200 includes a plurality of in-vehicle control devices 121 to 126 connected to an in-vehicle network.

The branches 1, 2, and 3 are connected to the trunk 7 in a star shape. The branches 4, 5, and 6 are also connected to the trunk 7 in a star shape at different locations. The ECUs (151 and 152) having termination are each connected to each of both ends of the trunk 7.

The branch 3 and the branch 4 are relatively long (for example, about 4 m), the branch 2 and the branch 5 are relatively short (for example, less than 1 m), and the branches 1 and 6 are in the middle of these. The time needed for the convergence of the noise depends on the length of the branch connected to the ECU in the transmission state. The ECUs (123 and 124) connected with the long branches (3 and 4) have circuit configurations (129 and 130) combining a filter circuit and a steady current suppression circuit so as to accelerate the convergence of noise.

In other words, at least the ECUs 123 and 124 (in-vehicle processing devices) connected with the longest branches 3 and 4 among the plurality of branches 1 to 6 have the same configuration as the ECU (100A) according to the first embodiment.

The ECUs (122 and 125) connected with the short branches (2 and 5) respectively have configurations (128 and 131) including no filter circuit or a steady current suppression circuit, with no insertion of circuits for accelerating convergence of noise.

The ECUs (121 and 126) connected with the middle-length branches (1 and 6) respectively have configurations (127 and 132) with the filter circuits alone, leading to convergence of the noise at a moderate speed.

In other words, at least the ECUs 121 and 126 (in-vehicle processing devices) respectively connected with the second longest branches 1 and 6 among the plurality of branches 1 to 6 have the configuration obtained by removing the steady current suppression circuit 113A from the ECU (100A) according to the first embodiment.

In this manner, circuit configurations that correspond to the noise convergence times make it possible to reduce the cost.

The present invention is not limited to the above-described embodiments, but may include various types of modification. For example, the above-described embodiments give detailed explanation just to allow the present invention to be clearly understood. Therefore, the present invention is not limited to the case having all of components in the configuration. In addition, a part of configuration of an embodiment can be replaced with a part of configuration of another embodiment. A part or the configuration of another embodiment can be added to a certain embodiment. Furthermore, it is possible to modify a portion of the configuration of each of the embodiments, such as addition, deletion, and replacement from another configuration.

While the above embodiment uses data transmission and reception performed by the CAN FD protocol, data transmission and reception may be performed by another communication protocol.

While the in-vehicle network in the above application example uses the star network topology in which signal reflection is likely to occur, other forms such as a bus topology may be adopted.

While the above application example uses the ECU (123 and 124) having the same configuration as the ECU (100A) according to the first embodiment as the ECU to constitute the in-vehicle system 200, it is allowable to use the ECU according to the second or third embodiment.

The embodiment of the present invention may be provided the following aspects.

(1) An in-vehicle processing device including a data transmission and reception device that transmits and receives data to and from an in-vehicle network, in which the data transmission and reception device includes a filter circuit that attenuates a reflected wave of the data, and a steady current suppression circuit (including C or the like other than R) that suppresses a steady current flowing through the filter circuit and facilitates a transient current flowing through the filter circuit.

(2) The in-vehicle processing device according to (1), including two communication lines that transmit and receive data, in which the filter circuits are connected in series to the two communication lines, respectively, and the two communication lines are connected with each other by the steady current suppression circuit.

(3) The in-vehicle processing device according to (1), in which the steady current suppression circuit is a capacitor circuit.

(4) The in-vehicle processing device according to (1), in which the steady current suppression circuit is an actively controlled current source.

(5) The in-vehicle processing device according to (1), in which the steady current suppression circuit is a switch element.

(6) The in-vehicle processing device according to (1), including a switching unit that switches connection on/off between the steady current suppression circuit and the filter circuit.

(7) The in-vehicle processing device according to (6), in which the switching unit disconnects the steady current suppression circuit and the filter circuit from each other at the time of data reception from another in-vehicle processing device connected to the in-vehicle network, and connects the steady current suppression circuit and the filter circuit with each other at the time of data transmission to another in-vehicle processing device.

(8) An in-vehicle network system including a plurality of in-vehicle processing devices each connected to an in-vehicle network via a communication line, in which each of the plurality of in-vehicle processing devices includes a data transmission and reception device that transmits and receives data to and from another in-vehicle processing device, a first in-vehicle processing device among the plurality of in-vehicle processing devices has a configuration in which the data transmission and reception device includes a filter circuit that attenuates a reflected wave of the data, and a current facilitating circuit (including R, and capacitor C, actively controlled current source, and a transistor forming a current path) that facilitates the current flowing through the filter circuit, and a second in-vehicle processing device different from the first in-vehicle processing device, among the plurality of in-vehicle processing devices, has a configuration in which the data transmission and reception device includes a filter circuit that attenuates a reflected wave of the data.

(9) The in-vehicle network system according to (8), in which a first communication line connecting the in-vehicle network and the first in-vehicle processing device with each other is longer than a second communication line connecting the in-vehicle network and the second in-vehicle processing device with each other.

That is, line connection is performed by using a steady current suppression circuit (such as a capacitor, an actively controlled current source, a transistor forming a current path) that suppresses the flow of a steady current (DC current) and facilitates the flow of a noise current (transient current) so as to allow sufficient noise current to flow through the filter circuit.

Unnecessary flow of DC current between CAN_H and CAN_L is suppressed by the steady current suppression circuit, making it possible to avoid signal quality degradation and power consumption deterioration, and possible to reduce the noise by the filter circuit, with the noise current flowing between CAN_H and CAN_L.

REFERENCE SIGNS LIST 1 to 6 branch
7 trunk
10 MPU
20A, 20B, 20C data transmission and reception device
30 CANFD transceiver
101, 102 filter circuit
103 capacitor
FD filter device
113A, 113B, 113C steady current suppression circuit
114 switch
121, 126 ECU having filter circuit alone
122, 125 ECU without filter circuit or steady current suppression circuit
123, 124 ECU having filter circuit and steady current suppression circuit
127, 132 configuration having filter circuit alone
128, 131 configuration without filter circuit or steady current suppression circuit
129, 130 configuration having filter circuit and steady current suppression circuit
151, 152 ECU with termination
200 in-vehicle system

The invention claimed is:

1. An in-vehicle processing device comprising:
   a data transmission and reception device that transmits and receives data; and
   a processor that controls the data transmission and reception device,
   the data transmission and reception device including:
      a filter device that attenuates noise superimposed on the data by reflection of the data,
      a steady current suppression circuit that suppresses a steady current flowing through the filter device and facilitates a transient current flowing through the filter device during a period in which the data transmission and reception device transmits the data,
      a first communication line and a second communication line constituting a differential transmission path, the filter device comprised of a first low-pass filter provided in the first communication line and a second low-pass filter provided in the second communication line, the steady current suppression circuit having one end connected to the first communication line and the other end connected to the second communication line,
   wherein the steady current suppression circuit is an actively controlled current source.

2. The in-vehicle processing device according to claim 1, wherein the steady current suppression circuit includes at least a capacitor.

3. The in-vehicle processing device according to claim 1, wherein the steady current suppression circuit is a switch element.

4. The in-vehicle processing device according to claim 1, wherein the steady current suppression circuit is constituted with:
   a resistor; and
   a switch element connected in series to the resistor, and the processor
      turns off the switch element during a period in which the data transmission and reception device receives the data, and
      turns on the switch element during a period in which the data transmission and reception device transmits the data.

5. The in-vehicle processing device according to claim 2, wherein the steady current suppression circuit includes a switch element connected in series to the capacitor, and the processor
      turns off the switch element during a period in which the data transmission and reception device receives the data, and
      turns on the switch element during a period in which the data transmission and reception device transmits the data.

6. The in-vehicle processing device according to claim 1, wherein the data transmission and reception device transmits and receives the data in accordance with a CAN FD (Controller Area Network with Flexible Data Rate) protocol, and
the steady current suppression circuit suppresses the steady current flowing through the filter device and facilitates the transient current flowing through the filter device in a data phase.

7. The in-vehicle processing device according to claim 1, wherein the data transmission and reception device transmits and receives the data in accordance with a CAN FD (Controller Area Network with Flexible Data Rate) protocol, and
the steady current suppression circuit
suppresses the steady current flowing through the filter device in a steady state of dominant or recessive, and
facilitates the transient current flowing through the filter device at the time of transition from the dominant to the recessive.

8. An in-vehicle system comprising:
an in-vehicle network including a trunk and a plurality of branches; and
a plurality of in-vehicle control devices connected to the in-vehicle network,
wherein at least an in-vehicle processing device connected to the longest branch among the plurality of branches includes:
 a data transmission and reception device that transmits and receives data; and
 a processor that controls the data transmission and reception device, and
the data transmission and reception device includes:
 a filter device that attenuates noise superimposed on the data by reflection of the data; and
 a steady current suppression circuit that suppresses a steady current flowing through the filter device and facilitates a transient current flowing through the filter device during a period in which the data transmission and reception device transmits the data,
a first communication line and a second communication line constituting a differential transmission path, the filter device comprised of a first low-pass filter provided in the first communication line and a second low-pass filter provided in the second communication line, the steady current suppression circuit having one end connected to the first communication line and the other end connected to the second communication line,
wherein the steady current suppression circuit is an actively controlled current source.

9. The in-vehicle system according to claim 8, wherein at least an in-vehicle processing device connected to the second longest branch among the plurality of branches includes:
 a data transmission and reception device that transmits and receives data; and
 a processor that controls the data transmission and reception device, and
the data transmission and reception device includes a filter device that attenuates noise superimposed on the data by reflection of the data.

* * * * *